US012799280B2

(12) United States Patent
Chae et al.

(10) Patent No.: US 12,799,280 B2
(45) Date of Patent: Nov. 17, 2026

(54) PHOTOCURABLE BLACK SILICONE COMPOSITION AND CURED PRODUCT THEREOF

(71) Applicants: DuPont Specialty Materials Korea Ltd., Chungcheongnam-do (KR); Duroptix Materials Kabushiki Kaisha, Tokyo (JP)

(72) Inventors: Jung Hye Chae, Hwaseong-Si (KR); Misoon Jung, Hwaseong-Si (KR); Shunya Takeuchi, Chiba (JP)

(73) Assignees: DuPont Specialty Materials Korea Ltd., Chungcheongnam-do (KR); Duroptix Materials Kabushiki Kaisha, Tokyo (JP)

( * ) Notice: Subject to any disclaimer, the term of this patent is extended or adjusted under 35 U.S.C. 154(b) by 626 days.

(21) Appl. No.: 18/324,648

(22) Filed: May 26, 2023

(65) Prior Publication Data

US 2023/0391957 A1 Dec. 7, 2023

(30) Foreign Application Priority Data

Jun. 2, 2022 (JP) ............................ JP2022-090283

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08G 77/20*** | (2006.01) |
| ***C08G 77/28*** | (2006.01) |
| ***C08J 3/28*** | (2006.01) |
| ***C08K 3/04*** | (2006.01) |
| ***C08K 5/37*** | (2006.01) |
| ***C08K 5/5397*** | (2006.01) |

(52) U.S. Cl.

CPC ............. *C08G 77/20* (2013.01); *C08G 77/28* (2013.01); *C08J 3/28* (2013.01); *C08K 3/04* (2013.01); *C08K 5/37* (2013.01); *C08K 5/5397* (2013.01); *C08G 2190/00* (2013.01); *C08K 2201/005* (2013.01); *C08K 2201/006* (2013.01); *C08K 2201/011* (2013.01)

(58) Field of Classification Search

CPC .......... C08K 5/5397; C08K 5/37; C08K 5/04; C08K 3/04; C08K 2201/011; C08K 2201/005; C08K 2201/006; C08G 77/20; C08G 77/28; C08G 2190/00; C08J 5/18; C08J 3/28; C08J 2383/04; C08L 83/04; C08L 83/00

USPC ................ 522/64, 6, 189, 184, 71, 1; 520/1

See application file for complete search history.

(56) References Cited

U.S. PATENT DOCUMENTS

| | | | | |
|---|---|---|---|---|
| 5,158,988 | A | 10/1992 | Kurita et al. | |
| 2017/0232775 | A1* | 8/2017 | Kuse | G03F 7/11 101/453 |
| 2020/0032062 | A1 | 1/2020 | Wallin et al. | |
| 2021/0269642 | A1* | 9/2021 | Takeuchi | C08K 5/5397 |
| 2022/0145020 | A1* | 5/2022 | Liu | C08J 3/243 |
| 2022/0403115 | A1* | 12/2022 | Chae | C08K 5/37 |
| 2023/0013987 | A1* | 1/2023 | Yook | C08J 3/28 |
| 2023/0174722 | A1* | 6/2023 | Chae | C08G 77/28 |

FOREIGN PATENT DOCUMENTS

| | | | | |
|---|---|---|---|---|
| JP | 4198270 | B2 | 12/2008 | |
| JP | 20200528940 | A | 10/2020 | |
| JP | 2022090283 | A | 6/2022 | |
| WO | 2018223365 | A1 | 12/2018 | |
| WO | WO-2021167051 | A1 * | 8/2021 | G02B 1/04 |

OTHER PUBLICATIONS

Ogawa, WO 2021167051 Machine Translation, Aug. 26, 2021 (Year: 2021).*

* cited by examiner

*Primary Examiner* — Jessica Whiteley

(74) *Attorney, Agent, or Firm* — Ingrassia Fisher & Lorenz, LLP | IFL

(57) ABSTRACT

The present invention relates to a photocurable silicone composition comprising: at least one organopolysiloxane having at least two alkenyl groups per molecule;

(B) at least one mercapto functional compound having at least two thiol groups per molecule;

(C) at least one photopolymerization initiator selected from acylphosphine oxide-type photopolymerization initiators and oxime ester-type photopolymerization initiators; and (D) at least one black pigment.

11 Claims, No Drawings

PHOTOCURABLE BLACK SILICONE COMPOSITION AND CURED PRODUCT THEREOF

CROSS-REFERENCE TO RELATED APPLICATIONS

This application claims priority pursuant to 35 U.S.C. 119(a) to Japanese Application No. 2022-090283, filed Jun. 2, 2022, which application is incorporated herein by reference in its entirety.

TECHNICAL FIELD

The present invention relates to a UV curable black silicone composition and a cured product thereof.

BACKGROUND ART

Curable silicone compositions are utilized in a wide range of industrial fields because they form cured products having excellent heat resistance, cold resistance, electrical insulation, weather resistance, water repellency, and transparency. The cured product of such a curable silicone composition is also suitable as a sealant for optical materials, such as light emitting diodes (LEDs), because it hardly becomes discolored as compared with other organic materials, and there is less deterioration of physical properties, such as durability. Among curable silicone compositions, UV curable silicone compositions are utilized for some products since they can avoid problems caused by heat for curing silicone compositions.

In order to color UV curable silicone compositions, pigments or dyes are widely used. For example, CN-A-109810516 discloses a UV-curable silicone rubber for DIW3D printing, comprising the following weight percentages of raw materials: 50% to 80% of unsaturated group-containing polysiloxane, 1% to 10% of sulfhydryl group-containing crosslinking agent, 0.1% to 10% of photoinitiator, 1% to 10% of rheology modifier 6% to 40% of filler, and 5% to 20% of reinforcing resin, wherein the sum of the weights of the components is 100%.

Black-colored curable compositions are used in, for example, films or layers laminated on substrate materials for image display components. However, there is a problem in that when photocurable black silicone compositions are employed for that purpose, they may not show enough curability.

SUMMARY OF THE INVENTION

An objective of the present invention is to provide a photocurable black silicone composition which exhibits an improved deep curability by an active energy ray radiation.

The above objective of the present invention can be achieved by a photocurable silicone composition comprising:

(A) at least one organopolysiloxane having at least two alkenyl groups per molecule;

(B) at least one mercapto functional compound having at least two thiol groups per molecule;

(C) at least one photopolymerization initiator selected from acylphosphine oxide-type photopolymerization initiators, oxime ester-type photopolymerization initiators, and alpha-hydroxyacetophenone-type photopolymerization initiators other than 1-hydroxycyclohexylphenylketone; and (D) at least one black pigment.

The (D) black pigment may be selected from carbon black.

The carbon black may have an average primary particle size of 5 nm or more and 1 μm or less.

The carbon black may have a specific surface area as determined by BET method of 0.5 $m^2/g$ or more and 31000 $m^2/g$ or less.

The carbon black may have an oil absorption capacity of 5 mL/100 g or more and 200 mL/100 g or less.

The (D) black pigment may be selected from organic black pigments.

The organic black pigment may be selected from perylene black pigments.

The (A) organopolysiloxane having at least two alkenyl groups per molecule may be present in an amount of 10% by weight or more and 98% by weight or less, relative to the total weight of the composition.

The (B) mercapto functional compound having thiol groups may be present in an amount of 1% by weight or more and 90% by weight or less, relative to the total weight of the composition.

The molar ratio of the thiol groups to alkenyl groups included in the composition is 0.1 or more and 5.0 or less.

The present invention also relates to a sealing agent or sheet film formed with the photocurable silicone composition according to the present invention.

Effects of the Invention

The present invention can provide a photocurable black silicone composition which can show an excellent deep curability by an active energy ray radiation.

MODE FOR CARRYING OUT THE INVENTION

After diligent research, the inventors have surprisingly discovered that a black-colored photocurable silicone composition showing an excellent deep curability can be obtained with a combination of the components (a) to (d) above, and thus completed the present invention.

Thus, the composition according to the present invention is a photocurable silicone composition comprising:

(A) at least one organopolysiloxane having at least two alkenyl groups per molecule;

(B) at least one mercapto functional compound having at least two thiol groups per molecule;

(C) at least one photopolymerization initiator selected from acylphosphine oxide-type photopolymerization initiators and oxime ester-type photopolymerization initiators; and (D) at least one black pigment.

The photocurable silicone composition according to the present invention exhibits an excellent curability by UV radiation, even though they include black pigments in a sufficient amount. Therefore, the photocurable silicone composition according to the present invention can be cured even under air conditions.

Hereinafter, the composition, process, and use according to the present invention will be explained in a more detailed manner.

[Photocurable Black Silicone Composition]

The photocurable black silicone composition according to the present invention comprises (A) at least one organopolysiloxane having at least two alkenyl groups per molecule; (B) at least one mercapto functional compound having at least two thiol groups per molecule; (C) at least one specific type of photopolymerization initiator; and (D) at least one black pigment.

Each of the components of the curable silicone composition will be explained below.

(A) Organopolysiloxane Having at Least Two Alkenyl Groups Per Molecule

The photocurable silicone composition according to the present invention comprises at least one organopolysiloxane having at least two alkenyl groups per molecule as component (A). The composition according to the present invention may comprise one type of (A) organopolysiloxane, or may comprise two or more types of (A) organopolysiloxane in combination.

The (A) organopolysiloxane having at least two alkenyl groups per molecule may be linear, branched, partially-branched, cyclic, or resinous. The term "linear" here means that the organopolysiloxane has a straight chain structure in its molecule and does not have a branched chain nor a branched structure. The term "resinous" here means that the organopolysiloxane has a branched or three-dimensional network structure in its molecule.

In one preferred embodiment of the present invention, the (A) organopolysiloxane is in a linear, cyclic, and/or resinous form. In one preferred embodiment of the present invention, the (A) organopolysiloxane comprises at least one linear organopolysiloxane. In another preferred embodiment of the present invention, the (A) organopolysiloxane comprises at least one cyclic organopolysiloxane.

The alkenyl group included in the component (A) may include $C_{2-12}$ alkenyl groups, such as vinyl, allyl, butenyl, pentenyl, hexenyl, heptenyl, octenyl, nonenyl, decenyl, undecenyl, and dodecenyl groups; and preferably a vinyl group.

Other silicon atom-bonded organic groups other than alkenyl groups included in component (A) may include $C_{1-12}$ alkyl groups such as methyl, ethyl, propyl, isopropyl, butyl, isobutyl, cert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl group; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. It should be noted that a small amount of a hydroxyl group or alkoxy group such as a methoxy or ethoxy group may be bonded to the silicon atom in the component (A), provided that this does not adversely affect the aim of the present invention. Preferably, the silicon atom-bonded organic groups other than alkenyl groups comprise a $C_{1-12}$ alkyl group, in particular a methyl group, and/or a $C_{6-12}$ aryl group, in particular a phenyl group. Component (A) may not include any thiol groups.

In one embodiment of the present invention, the (A) organopolysiloxane having at least two alkenyl groups per molecule comprises a linear organopolysiloxane which can be represented by the following formula (I-a):

(A) average structural formula (I-a): $R^1_3SiO(R^1_2SiO)_mSiR^1_3$ in which, $R^1$ indicates the same or different monovalent hydrocarbon(s), which can be optionally substituted with at least one halogen, wherein at least two of $R^1$ per molecule represent alkenyl groups; and m ranges from 1 to 1,000.

In formula (I-a), m preferably ranges from 2 to 750, more preferably from 5 to 500, and even more preferably ranges from 10 to 250.

The monovalent hydrocarbon for which can be optionally substituted with at least one halogen, may include, $C_{1-12}$ alkyl groups such as methyl, ethyl, propyl, isopropyl, butyl, isobutyl, cert-butyl, pentyl, neopentyl, hexyl, cyclohexyl, heptyl, octyl, nonyl, decyl, undecyl and dodecyl groups; $C_{2-12}$ alkenyl groups, such as vinyl, allyl, butenyl, pentenyl, hexenyl, heptenyl, octenyl, nonenyl, decenyl, undecenyl, and dodecenyl groups; $C_{6-12}$ aryl groups such as phenyl, tolyl, xylyl and naphthyl groups; benzyl groups; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. The monovalent hydrocarbon in $R^1$ may include a small amount of a hydroxyl group or alkoxy group such as a methoxy or ethoxy group, provided that this does not adversely affect the aim of the present invention. Preferably, the monovalent hydrocarbon in $R^1$ represents a $C_{1-12}$ alkyl group, in particular a methyl group; a $C_{6-12}$ aryl group, in particular a phenyl group; and a $C_{2-12}$ alkenyl group, in particular a vinyl group, as the alkenyl groups.

In one preferred embodiment of the present invention, the linear organopolysiloxane of the component (A) can be a linear organopolysiloxane in which both ends of the molecular chain are capped with alkenyl groups, and in particular, a linear dimethylpolysiloxane comprising dimethylvinylsiloxy groups at the both ends of the molecular chain.

In one embodiment of the present invention, the (A) organopolysiloxane comprises alkenyl groups at the end of the molecule. This means that the (A) organopolysiloxane comprises alkenyl groups at M siloxane units represented by $(SiO_{1/2})$. The (A) organopolysiloxane may or may not comprise alkenyl groups at D siloxane units represented by $(SiO_{2/2})$ and/or T units, however, it preferably does not comprise alkenyl groups at D or T units.

In another embodiment, the (A) organopolysiloxane comprises alkenyl groups of at least 2 alkenyl groups in side-chains of the molecular chain.

In another embodiment of the present invention, the (A) organopolysiloxane having at least two alkenyl groups per molecule is a resinous organopolysiloxane which can be represented by the following formula (I-b):

$$(R^1_3SiO_{1/2})_a(R^1_2SiO_{2/2})_b(R^1SiO_{3/2})_c(SiO_{4/2})_d(XO_{1/2})_e \quad \text{(A) average unit formula(I-b):}$$

in which, $R^1$ indicates the same or different monovalent hydrocarbon(s), which can be optionally substituted with at least one halogen, wherein at least two of $R^1$ per molecule represent alkenyl groups; X represents a hydrogen atom or an alkyl group; and $0 \le a < 1$, $0 \le b < 1$, $0 \le c < 0.95$, $0 \le d < 0.9$, $0 \le e < 0.4$, $a+b+c+d=1.0$, and $c+d>0$ are satisfied.

The same definition for $R^1$ in formula (I-a) can be applied to $R^1$ in formula (I-b).

In formula (I-b), X represents a hydrogen atom or an alkyl group. The alkyl group in X preferably represents a $C_{1-3}$ alkyl group such as a methyl, ethyl, or propyl group.

In one embodiment of the present invention, in formula (I-b), a ranges preferably from $0.05 \le a \le 0.8$, more preferably in the range of $0.1 \le a \le 0.6$, and even more preferably in the range of $0.15 \le a \le 0.4$. In formula I-b), b ranges preferably from $0 \le b \le 0.5$, more preferably from $0 \le b \le 0.3$, and even more preferably from $0 \le b \le 0.1$. In formula I-b), c ranges preferably from $0.2 \le c \le 0.9$, more preferably from $0.4 \le c \le 0.85$, and even more preferably from $0.6 \le c \le 0.8$. In formula (I-b), d ranges preferably from $0 \le d \le 0.5$, more preferably from $0 \le d \le 0.3$, and even more preferably from $0 \le d \le 0.1$. In formula (I-b), e ranges preferably from $0 \le e \le 0.2$, more preferably from $0 \le e \le 0.1$, and even more preferably from $0 \le e \le 0.05$.

In one embodiment of the present invention, the linear organopolysiloxane of the component (A) can be a linear dimethylpolysiloxane comprising dimethylvinylsiloxy groups at the both ends of the molecular chain.

In one embodiment of the present invention, the (A) organopolysiloxane comprises alkenyl groups at the end of the molecule. This means that the (A) organopolysiloxane comprises alkenyl groups at M siloxane units represented by $(SiO_{1/2})$. The (A) organopolysiloxane may or may not comprise alkenyl groups at D siloxane units represented by $(SiO_{2/2})$ and/or T units represented by $(SiO_{3/2})$, however, it preferably does not comprise alkenyl groups at D or T units.

In one preferred embodiment of the present invention, the (A) organopolysiloxane having at least two alkenyl groups per molecule comprises a cyclic organopolysiloxane which can be represented by the following formula (I-c):

$(R^2SiO)_m$ (A) average structural formula (I-c):

in which, R indicates the same or different monovalent hydrocarbon, which can be optionally substituted with at least one halogen, wherein at least two of R per molecule represent alkenyl groups; and m is an integer such that the cyclic organopolysiloxane has a viscosity of less than 100 mPa·s at 25° C.

In formula (I-c), the monovalent hydrocarbon for R, which can be optionally substituted with at least one halogen, may include, $C_{1-12}$ alkyl groups such as methyl, ethyl, propyl, isopropyl, butyl, isobutyl, cert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl groups; $C_{2-12}$ alkenyl groups, such as vinyl, allyl, butenyl, pentenyl, hexenyl, heptenyl, octenyl, nonenyl, decenyl, undecenyl, and dodecenyl groups; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. The monovalent hydrocarbon in $R^1$ may include a small amount of a hydroxyl group or alkoxy group such as a methoxy or ethoxy group, provided that this does not adversely affect the aim of the present invention. Preferably, the monovalent hydrocarbon in R represents a $C_{1-12}$ alkyl group, in particular a methyl group, and a $C_{2-12}$ alkenyl group, in particular a vinyl group.

In formula (I-c), m may be an integer from 4 to 50, preferably from 4 to 30, more preferably from 4 to 20, even more preferably from 4 to 10, and in particular from 4 to 8.

The amount of the alkenyl groups relative to the total amount of the silicon atom-bonded groups in the (A) organopolysiloxane is not particularly limited, but for example, when the (A) organopolysiloxane is linear or resinous, the amount of the alkenyl groups may be 0.5 mol % or more, preferably 1 mol % or more, more preferably 2 mol % or more, and in particular 3 mol % or more, and/or may be in general 30 mol % or less, preferably 20 mol % or less, more preferably 10 mol % or less, and in particular 5 mol % or less, relative to the total amount of the silicon atom-bonded groups. When the (A) organopolysiloxane is cyclic, the amount of the alkenyl groups may be 20 mol % or more, preferably 30 mol % or more, more preferably 40 mol % or more, and in particular 45 mol % or more, and may be in general 80 mol % or less, preferably 70 mol % or less, more preferably 60 mol % or less, and in particular 55 mol % or less, relative to the total amount of the silicon atom-bonded organic groups.

The amount of the alkenyl groups can be measured, for example, with analytical methods such as Fourier transform infrared spectroscopy (FT-IR) or nuclear magnetic resonance (NMR), or the following titration method.

The method for quantifying the amount of alkenyl groups in organopolysiloxane by the titration method will be described below. The content of alkenyl groups in organopolysiloxane can be accurately quantified by the titration method known as the Wijs method. The principle is described below. First, alkenyl groups present in organopolysiloxane raw materials and iodine monochlorides are subjected to an addition reaction as shown in Equation (1). Next, by the reaction represented by Equation (2), iodine monochlorides in an excess quantity are reacted with potassium iodides so as to be released as iodines. The free iodines are then titrated with a sodium thiosulfate solution.

$$CH_2{=}CH{-}{+}2ICl \rightarrow CH_2I{-}CHCl{-}{+}ICl(\text{excess quantity}) \quad \text{Equation (1)}$$

$$ICl+KI \rightarrow I_2+KCl \quad \text{Equation (2)}$$

The amount of the alkenyl groups present in the organopolysiloxane can be quantified from the difference between the amounts of sodium thiosulfate required for the titration above and for a blank solution prepared separately.

In one embodiment of the present invention, the (A) organopolysiloxane comprises at least one aryl group in the silicon atom-bonded groups. This means that at least one of $R^1$ in formula (I-a) and/or (I-b) may represent an aryl group. In one embodiment of the present invention, the (A) organopolysiloxane comprises at least one aryl group at a D unit or T unit. The (A) organopolysiloxane may or may not comprise aryl groups at M unit, but preferably does not comprise any aryl groups at an M unit. The aryl group can be selected from $C_{6-12}$ aryl groups such as a phenyl, tolyl, xylyl and naphthyl group.

In the case that the (A) organopolysiloxane comprises at least one aryl group, the content of the aryl groups in the (A) organopolysiloxane is not particularly limited, but may be in general 5 mol % or more, preferably 10 mol % or more, more preferably 20 mol % or more, even more preferably 30 mol % or more, and in particular 40 mol % or more, and may be in general 80 mol % or less, preferably 70 mol % or less, more preferably 60 mol % or less, even more preferably 55 mol % or less, and in particular 50 mol % or less, relative to the total amount of the silicon atom-bonded groups. The amount of the aryl groups can be measured, for example, with analytical methods such as Fourier transform infrared spectroscopy (FT-IR) or nuclear magnetic resonance (NMR), or the above titration method.

In one another embodiment of the present invention, the (A) organopolysiloxane does not comprise any aryl groups in the silicon atom-bonded groups. In this embodiment, the (A) organopolysiloxane may be linear or resinous vinylmethylsiloxane having at least two alkenyl groups per molecule.

As specific examples of the resinous vinylmethylsiloxane which can be used in the present invention, mention can be made of those represented by the following formula (II):

(II)

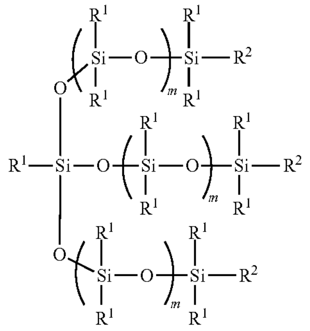

wherein $R^1$ and $R^2$ each independently represent a monovalent hydrocarbon including an alkenyl group, wherein at least two of $R^2$ are alkenyl groups, m represents an integer of 1 or more, and n represents 0 or an integer of 1 to 5. The hydrocarbon and alkenyl group in formula (II) are the same as those explained for the component (A) above.

In formula (II), m is preferably 1 to 20, more preferably 1 to 10, and still more preferably 1 to 5.

The weight-average molecular weight of the vinylmethylsiloxane resin is not particularly limited, but is preferably 300 to 5,000, more preferably 300 to 2,500, and still more preferably 500 to 1,500. The weight-average molecular weight can be measured (in terms of polystyrene) using gel permeation chromatography (GPC).

As a commercial product of the vinylmethylsiloxane resin represented by formula (II) above, mention can be made of MTV-112 (trade name) manufactured by GELEST, INC.

The viscosity of the (A) organopolysiloxane is not particularly limited, but may be for example 5 mPa to 5,000 mPa at 25° C. The viscosity of organopolysiloxane components herein can be measured with a rotational viscometer compliant with JIS K7117-1.

The (A) organopolysiloxane may be present in an amount of 10% by weight or more, preferably 30% by weight or more, more preferably 50% by weight or more, even more preferably 650% by weight or more, and in particular 80% by weight or more, and/or may be present in an amount of 98% by weight or less, preferably 95% by weight or less, relative to the total weight of the composition.

The (A) organopolysiloxane may be present in the composition according to the present invention in an amount of 10% to 98% by weight, preferably 30% to 98% by weight, more preferably 50% to 95% by weight, even more preferably 65% to 95% by weight, and in particular 80% to 95% by weight, relative to the total weight of the composition.

In one embodiment of the present invention, the linear or resinous organopolysiloxane may be present in the composition according to the present invention in an amount of 50% to 98% by weight, preferably 60% to 98% by weight, more preferably 70% to 95% by weight, even more preferably 75% to 95% by weight, and in particular 80% to 95% by weight, relative to the total weight of the composition.

In another embodiment of the present invention, the cyclic organopolysiloxane may be present in the composition according to the present invention in an amount of 10% to 70% by weight, preferably 15% to 60% by weight, more preferably 20% to 50% by weight, even more preferably 25% to 45% by weight, and in particular 30% to 40% by weight, relative to the total weight of the composition.

(B) Mercapto Functional Compound Having at Least Two Thiol Groups Per Molecule

The photocurable silicone composition according to the present invention comprises at least one mercapto functional compound having at least two thiol groups per molecule as component (B). The composition according to the present invention may comprise one type of the (B) mercapto functional compound, or may comprise two or more types of the (B) mercapto functional compounds in combination.

The (B) mercapto functional compound may be selected from mercapto functional organic compounds having at least two thiol groups per molecule and mercapto functional silicone compounds having at least two thiol groups per molecule.

The (B) mercapto functional compound may comprise primary or secondary thiol groups per molecule.

The (B) mercapto functional compound may comprise three or more thiol groups.

In the mercapto functional organic compounds, the term "organic compound" here means compounds having a C-C backbone structure. The composition according to the present invention may comprise one type of the mercapto functional organic compound, or may comprise two or more types of the mercapto functional organic compounds in combination.

The mercapto functional organic compound may be multifunctional thiol compounds, such as those having 2 to 6 thiol groups, preferably 3 to 5 thiol groups, and more preferably 3 to 4 thiol groups.

The type of the thiol groups in the mercapto functional organic compound may be selected from a primary thiol, a secondary thiol, and a tertiary thiol. Preferably, the mercapto functional organic compound comprises one or more secondary thiol groups as the thiol groups.

In particular, the mercapto functional organic compound may be dithiol compounds having two secondary thiol groups.

The weight average molecular weight (Mw) of the mercapto functional organic compounds is not particularly limited, but is in general 100 or greater, preferably 150 or greater, more preferably 200 or greater, and even more preferably 300 or greater, and is in general 1,000 or less, preferably 800 or less, more preferably 600 or less, and even more preferably 500 or less. The weight average molecular weight can be measured by, for example, gel permeation chromatography (GPC).

A thiol group equivalent, i.e. a value obtained by dividing the molecular weight of the thiol compound by the number of thiol groups (the molecular weight of the thiol compound/the number of thiol groups —SH of the thiol compound), of the mercapto functional organic compounds is not particularly limited, but in general is 50 or greater, preferably 100 or greater, and more preferably 125 or more, and is in general 500 or less, preferably 400 or less, and more preferably 300 or less.

As examples of secondary dithiol compounds, mention can be made of, for example, 1,4-bis (3-mercaptobutylyloxy) butane, bis(1-mercaptoethyl) phthalate, bis(2-mercaptopropyl) phthalate, bis(3-mercaptobutyl) phthalate, ethylene glycol bis(3-mercaptobutyrate), propylene glycol bis(3-mercaptobutyrate), diethylene glycol bis(3-mercaptobutyrate), butanediol bis(3-mercaptobutyrate), octanediol bis(3-mercaptobutyrate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), ethylene glycol bis(4-mercaptovalerate), propylene glycol bis(4-mercaptoisovalerate), diethylene glycol bis(4-mercaptovalerate), butanediol bis(4-mercaptovalerate), octanediol bis(4-mercaptovalerate), ethylene glycol bis(3-mercaptovalerate), propylene glycol bis(3-mercaptovalerate), diethylene glycol bis(3-mercaptovalerate), butanediol bis(3-mercaptovalerate), and octanediol bis(3-mercaptovalerate).

As examples of secondary trithiol compounds, mention can be made of, for example, trimethylolpropane tris(3-mercaptobutyrate), trimethylolpropane tris(2-mercaptopropionate), trimethylolpropane tris(4-mercaptovalerate), trimethylolpropane tris(3-mercaptovalerate), and 1,3,5-tris(3-mercaptobutyloxyethyl)-1,3,5-triazine-2,4,6(1H, 3H, 5H)-trione.

As examples of secondary tetrathiol compounds, mention can be made of, for example, dipentaerythritol hexakis(3-mercaptobutyrate), pentaerythritol tetrakis(2-mercaptopropionate), pentaerythritol tetrakis(3-mercapto-2-propionate), pentaerythritol tetrakis(2-mercaptoisobutyrate), pentaerythritol tetrakis(4-mercaptovalerate), and pentaerythritol tetrakis(3-mercaptovalerate)

As examples of secondary hexathiol compounds, mention can be made of, for example, dipentaerythritol hexakis(3-mercaptobutyrate), dipentaerythritol hexakis(2-mercaptopropionate), dipentaerythritol hexakis(2-mercaptoisobutyrate), dipentaerythritol hexakis(4-mercaptovalerate), and dipentaerythritol hexakis(3-mercaptovalerate)

As examples of primary dithiol compounds, mention can be made of, for example, 2,2'-(ethylenedioxy)ethanethiol and ethylene glycol bis-mercaptoacetate.

As examples of primary trithiol compounds, mention can be made of, for example, trimethylolpropane tris(3-mercaptopropionate).

As examples of primary tetrathiol compounds, mention can be made of, for example, pentaerythritol tetrakis(3-mercaptopropionate).

In one embodiment of the present invention, the mercapto functional organic compound does not include a hydroxyl group.

The (B) mercapto functional compound can be a mercapto functional silicone compound having at least two thiol groups per molecule. The composition according to the present invention may comprise one type of the mercapto functional silicone compound, or may comprise two or more types of the mercapto functional silicone compounds in combination.

The structure of the mercapto functional organopolysiloxane can be linear, branched, partially-branched, cyclic, or resinous. In one preferred embodiment of the present invention, the mercapto functional organopolysiloxane has a linear structure or a branched structure.

The mercapto functional organopolysiloxane has at least two thiol groups per molecule. The mercapto functional organopolysiloxane may have the thiol groups at the end of the polymer chain or at silicon atoms other than the ends of the polymer chain, i.e. as pendant groups. In one preferred embodiment of the present invention, the mercapto functional organopolysiloxane has the thiol groups at silicon atoms other than the ends of the polymer chain, i.e. as pendant groups, and does not have any thiol groups at the ends of the polymer chain.

Silicon atom-bonded organic groups other than thiol groups included in the mercapto functional organopolysiloxane may include $C_{1-12}$ alkyl groups such as methyl, ethyl, propyl, isopropyl, butyl, isobutyl, cert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl groups; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. Preferably, the silicon atom-bonded organic groups other than alkenyl groups comprise a $C_{1-12}$ alkyl group, in particular a methyl group.

Specific examples of the mercapto functional silicone compound include, but are not limited to, those available under the trade names SMS-022, SMS-042, and SMS-142 from Gelest Inc, which are [(mercaptopropyl)methylsiloxane]-dimethylsiloxane copolymers, as well as KF-2001 and KF-2004 from Shin-Etsu Chemical Co. Ltd, in which some silicon atoms internal to the polymer chain, i.e., not at the termini, are substituted with mercaptoalkyl groups. Another silicone compound which can be mentioned is X-22-167B from Shin-Etsu Chemical Co. Ltd., in which both terminal silicon atoms are substituted with mercaptoalkyl groups.

The amount of the thiol groups relative to the total amount of the silicon atom-bonded organic groups in the (B) mercapto functional organopolysiloxane is not particularly limited, but may be preferably, 5 mol % or more, more preferably 10 mol % or more, and may be in general 80 mol % or less, and preferably 65 mol % or less, relative to the total amount of the silicon atom-bonded organic groups. The amount of the thiol groups can be measured, for example, with analytical methods such as Fourier transform infrared spectroscopy (FT-IR) or nuclear magnetic resonance (NMR).

The (B) mercapto functional organopolysiloxane may have a viscosity of from 30 cSt or greater, preferably 50 cSt or greater, and more preferably 70 cSt or greater, and may have a viscosity of 20000 cSt or less, preferably 17500 cSt or less, and more preferably 15000 cSt or less at 25° C. The viscosity of this silicone may be measured according to standard ASTM D-445.

The weight average molecular weight (Mw, g/mol) of themercapto functional organopolysiloxane is not particularly limited, but is in general 500 or greater, preferably 1,000 or greater, and is in general 30,000 or less, preferably 20,000 or less, more preferably 15,000 or less, and even more preferably 10,000 or less. The weight average molecular weight can be measured by, for example, gel permeation chromatography (GPC).

In one preferred embodiment of the present invention, the (B) mercapto functional organopolysiloxane is a branched polymer, which does not have a cross-linked structure or a three-dimensional network structure. As a preferred example, the branched polymer of the (B) mercapto functional organopolysiloxane comprises a following structure unit:

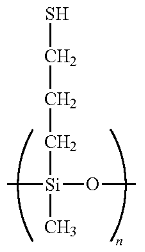

wherein n may be an integer ranging from 5 to 200, preferably 10 to 150.

As another preferred example of the branched polymer of the (B) mercapto functional organopolysiloxane, mention can be made of (mercaptopropyl)methylsiloxane homopolymer, which can be represented by the following formula (III):

(Formula III)

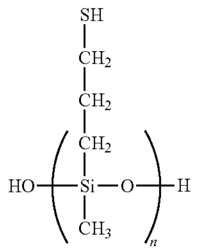

wherein n is an integer ranging from 5 to 200, preferably 10 to 150, more preferably 15 to 100, and even more preferably 20 to 85.

Commercialized products of (mercaptopropyl)methylsiloxane homopolymer include SMS-992 sold by Gelest Inc.

In a specific embodiment of the present invention, when the (B) mercapto functional organopolysiloxane is the branched polymer, the amount of the thiol groups relative to the total amount of the silicon atom-bonded organic groups in the (B) mercapto functional organopolysiloxane is 10 mol % or more and in general 50 mol % or less, preferably 30 mol % or less, and even more preferably 20 mol % or less, relative to the total amount of the silicon atom-bonded organic groups.

In another embodiment of the present invention, the (B) mercapto functional organopolysiloxane can be resinous.

In one embodiment of the present invention, the (B) resinous mercapto functional organopolysiloxane can be represented by the following formula (III):

$(R^1{}_3SiO_{1/2})_a(R^1{}_2SiO_{2/2})_b(R^1SiO_{3/2})_c(SiO_{4/2})_d(XO_{1/2})_e$ (A) average unit formula (III):

in which, $R^1$ indicates the same or different monovalent hydrocarbon group(s) or a thiol group, which can be optionally substituted with at least one halogen, wherein at least two of $R^1$ per molecule represent thiol groups; X represents a hydrogen atom or an alkyl group; and $0 \le a < 1$, $0 \le b < 1$, $0 \le c < 0.95$, $0 \le d < 0.9$, $0 \le e < 0.4$, $a+b+c+d=1.0$, and $c+d>0$ are satisfied.

In formula (III), the monovalent hydrocarbon for 10, which can be optionally substituted with at least one halogen, may include $C_{1-12}$ alkyl groups such as methyl, ethyl, propyl, isopropyl, butyl, isobutyl, cert-butyl, pentyl, neopentyl, hexyl, cyclohexyl, heptyl, octyl, nonyl, decyl, undecyl and dodecyl groups; $C_{6-12}$ aryl groups such as phenyl, tolyl, xylyl and naphthyl groups; benzyl groups; $C_{7-12}$ aralkyl groups such as phenethyl, and phenylpropyl groups; and groups obtained by substituting some or all of the hydrogen atoms in these groups with halogen atoms such as fluorine, chlorine or bromine atoms. Preferably, the monovalent hydrocarbon comprises a $C_{1-12}$ alkyl group, in particular a methyl group.

In formula (III), X represents a hydrogen atom or an alkyl group. The alkyl group in X preferably represents a $C_{1-3}$ alkyl group such as a methyl, ethyl, or propyl group.

In one embodiment of the present invention, in formula (III), a ranges preferably from $0.1 \le a \le 0.8$, more preferably in the range of $0.2 \le a \le 0.65$, and even more preferably in the range of $0.3 \le a \le 0.5$. In formula (III), b ranges preferably from $0 \le b \le 0.5$, more preferably from $0 \le b \le 0.3$, and even more preferably from $0 \le b \le 0.1$. In formula (III), c ranges preferably from $0.1 \le c \le 0.8$, more preferably from $0.2 \le c \le 0.65$, and even more preferably from $0.3 \le c \le 0.5$. In formula (III), d ranges preferably from $0.05 \le d \le 0.5$, more preferably from $0.1 \le d \le 0.4$, and even more preferably from $0.1 \le d \le 0.3$. In formula e ranges preferably from $0 \le e \le 0.2$, more preferably from $0 \le e \le 0.1$, and even more preferably from $0 \le e \le 0.05$.

In another embodiment of the present invention, the (B) resinous mercapto functional organopolysiloxane can be represented by the following formula (III'):

$(R^1{}_3SiO_{1/2})_a(R^1{}_2SiO_{2/2})_b(R^2SiO_{3/2})_c(SiO_{4/2})_d(XO_{1/2})_e$ (A)average unit formula (IT):

in which, $R^1$ indicates the same or different monovalent hydrocarbon(s), which can be optionally substituted with at least one halogen; $R^2$ indicates a thiol group; X represents a hydrogen atom or an alkyl group; and $0 \le a < 1$, $0 \le b < 1$, $0 < c < 0.95$, $0 \le d < 0.9$, $0 \le e < 0.4$, and $a+b+c+d=1.0$ are satisfied, wherein the organopolysiloxane has at least two $R^2$ radicals per molecule.

The same explanations about the monovalent hydrocarbon, X, a, b, c, d, and e in formula (III) can be applied to formula (III').

In one embodiment, the resinous mercapto functional organopolysiloxane represented by formula (III) or (III') does not include any D unit represented by $(SiO_{2/2})$. In another embodiment, the resinous mercapto functional organopolysiloxane represented by formula (III') can be represented by $MT^{SH}Q$ resin.

Commercialized products of the resinous mercapto functional organopolysiloxane include:

Resinous mercapto functional organopolysiloxane represented by the formula $M_{42}T^{SH}{}_{41}Q_{17}$, and Resinous mercapto functional organopolysiloxane represented by the formula $M_{44}T^{SH}{}_{42}Q_{12}$.

In a specific embodiment of the present invention, when the (B) mercapto functional organopolysiloxane is resinous, the amount of the thiol groups relative to the total amount of the silicon atom-bonded organic groups in the (B) mercapto functional organopolysiloxane is 5 mol % or more, more preferably 10 mol % or more, and in general 35 mol % or less, and preferably 25 mol % or less, relative to the total amount of the silicon atom-bonded organic groups.

The (B) mercapto functional compound may be present in an amount of 1% by weight or more, preferably 2% by weight or more, more preferably 3% by weight or more, even more preferably 4% by weight or more, and in particular 5% by weight or more, and may be present in an amount of 90% by weight or less, preferably 85% by weight or less, more preferably 80% by weight or less, and even more preferably 75% by weight or less, relative to the total weight of the composition.

The (B) mercapto functional compound may be present in the composition according to the present invention in an amount of 1% to 90% by weight, preferably 2% to 80% by weight, more preferably 3% to 75% by weight, even more preferably 4% to 70% by weight, and in particular 5% to 65% by weight, relative to the total weight of the composition.

In one embodiment, the composition according to the present invention may comprise the mercapto functional organic compound in an amount of 1% to 25% by weight, preferably 2% to 20% by weight, more preferably 3% to 15% by weight, even more preferably 4% to 10% by weight, and in particular 5% to 10% by weight, relative to the total weight of the composition.

In one embodiment of the present invention, when the (A) organopolysiloxane comprises a cyclic organopolysiloxane, the (B) mercapto functional compound preferably comprises mercapto functional organopolysiloxane. In this embodiment, the content of the mercapto functional organopolysiloxane may be 20% to 90% by weight, preferably 30% to 80% by weight, more preferably 40% to 75% by weight, even more preferably 45% to 70% by weight, and in particular 50% to 65% by weight The molar ratio of the thiol groups, which can be derived from the (B) mercapto functional compound, to alkenyl groups, which can be derived from the (A) organopolysiloxane, included in the curable silicone composition of the present invention may be 0.1 or more, preferably 0.3 or more, more preferably 0.5 or more, and even more preferably 0.8 or more; and may be 5.0 or less, preferably 4.0 or less, more preferably 3.0 or less, even more preferably 2.0 or less, and in particular 1.5 or less.

In some specific embodiments of the present invention, the composition according to the present invention comprises the following combinations (i) to (iii) of components (A) and (B):

(i) the (A) linear organopolysiloxane in which both ends of the molecular chain are capped with alkenyl groups and/or the (A) branched organopolysiloxane containing at least two alkenyl groups at the ends of the molecular chain, and the (B) mercapto functional organopolysiloxane containing at least two thiol groups in side-chains of the molecular chain, wherein the thiol group content is 1% by mass or more per molecule;

(ii) the (A) linear organopolysiloxane containing at least two alkenyl groups in side-chains of the molecular chain and/or the (A) resinous organopolysiloxane containing at least two alkenyl groups at the ends of the molecular chain, and the (B) linear mercapto functional organopolysiloxane in which both ends of the molecular chain are capped with thiol groups, wherein the thiol group content is 1% by mass or more per molecule; and (iii) the (A) alkenyl group- and aryl group-containing organopolysiloxane and the (B) multifunctional thiol compound, but furthermore comprising an alkenyl group-containing resinous organopolysiloxane when the multifunctional thiol compound contains only a bifunctional thiol compound.

In the embodiment (ii), the amount of the organopolysiloxane containing at least 2 alkenyl groups in side-chains of the molecular structure and/or the resinous organopolysiloxane containing at least 2 alkenyl groups at the ends of the molecular chain is not particularly limited, but can be 10% by mass or more, 20% by mass or more, 30% by mass or more, 40% by mass or more, or 50% by mass or more, and can be no more than 90% by mass, no more than 85% by mass, or no more than 80% by mass, based on the total weight of components (A) and (B).

(C) Photopolymerization Initiator

The photocurable silicone composition according to the present invention comprises at least one photopolymerization initiator as component (C). The composition according to the present invention may comprise one type of the (C) photopolymerization initiator, or may comprise two or more types of (C) photopolymerization initiators in combination.

The (C) photopolymerization initiator of the present invention is selected from acylphosphine oxide-type photopolymerization initiators, oxime ester-type photopolymerization initiators, and alpha-hydroxyacetophenone-type photopolymerization initiators other than 1-hydroxycyclohexylphenylketone.

The acylphosphine oxide-type photopolymerization initiators may be selected from, for example, (2,4,6-trimethylbenzoyl)-diphenyl-phosphine oxide, which is sold by IGM RESINS B.V. under the name of Omnirad TPO-H, ethyl phenyl-(2,4,6-trimethylbenzoyl)-phosphinate, which is sold by IGM RESINS B.V. under the name of Omnirad TPO-L, and bis(2,4,6-trimethylbenzoyl)phenylphosphine oxide, which is sold by IGM RESINS B.V. under the name of Omnirad 819, bis(2,6-dimethoxybenzoyl)-2,4,4-trimethylpentylphosphine oxide, and a combination thereof.

As the product of the acylphosphine oxide-type photopolymerization initiator, mention can be also made of Omnirad 2100 sold by IGM RESINS B.V, which includes a combination of ethyl phenyl-(2,4,6-trimethylbenzoyl)-phosphinate (about 95 wt %) and bis(2,4,6-trimethylbenzoyl)phenylphosphine oxide (about 5 wt %).

As the oxime ester-type photopolymerization initiators, mention can be made of 3-benzooxyiminobutan-2-one, 3-acetoxyiminobutan-2-one, 3-propionyloxyiminobutan-2-one, 2-acetoxyiminopentan-3-one, 2-acetoxyimino-1-phenyl propan-1-one, 2-benzoyloxyimino-1-phenylpropan-1-one, 3-(4-toluenesulfonyloxy)iminobutan-2-one, 2-ethoxycarbonyloxyimino-1-phenylpropan-1-one, and the like.

As commercially available oxime ester-type photopolymerization initiators, mention can be made of, for example, 1-[4-(phenylthio) phenyl]-1,2-octanedione-2-(o-benzoyloxime), which is sold by BASF under the name of Irgacure OXE-01, 1-[9-ethyl-6-(2-methylbenzoyl)-9H-carbazol-3-yl] ethanone-1-(o-acetyloxime), which is sold by BASF under the name of Irgacure OXE-02, as well as the products of Irgacure OXE-03 and Irgacure OXE-04, which are sold by BASF, and a combination thereof.

Examples of alpha-hydroxyacetophenone may include 2-hydroxy-2-methyl-1-phenyl-1-propanone (by IGM Resins B. V.; brand name: Omnirad 1173); 2-hydroxy-4'(2-hydroxyethoxy)-2-methylpropiophenone (by IGM Resins B. V; brand name Omnirad 2959), oligo-[2-hydroxy-2-methyl-1-[4-(1-methylvinyl)-phenyl]-propanone], and 1,1'-(methylene-di-4,1-phenylene) bis [2-hydroxy-2-methyl-1-propanone] (by IGM Resins B. V; brand name: Omnirad 127D).

The (C) photopolymerization initiator may be present in an amount of 0.01% by weight or more, preferably 0.05% by weight or more, more preferably 0.1% by weight or more, and even more preferably 0.5% by weight or more, and may be present in an amount of 5% by weight or less, preferably 4% by weight or less, more preferably 3% by weight or less, and even more preferably 2% by weight or less, relative to the total weight of the composition.

The (C) photopolymerization initiator may be present in the composition according to the present invention in an amount of 0.01% to 5% by weight, preferably 0.05% to 4% by weight, more preferably 0.1% to 3% by weight, even more preferably 0.5% to 2% by weight, relative to the total weight of the composition.

(D) Black Pigment

The photocurable silicone composition according to the present invention comprises at least one black pigment as component (D). The composition according to the present invention may comprise one type of the (D) black pigment, or may comprise two or more types of (D) black pigments in combination.

The term "pigments" should be understood as meaning inorganic or organic particles of any shape which are insoluble and are intended to color the composition.

The black pigments can be inorganic black pigments and/or organic black pigments.

The inorganic black pigment is not particularly limited and any known inorganic black pigments can be used. As the black inorganic pigment, mention can be made of carbon black, graphite, and fine particles of metal such as titanium, copper, iron, manganese, cobalt, chromium, nickel, zinc, calcium or silver, and oxides, sulfides, sulfates, nitrates, carbonates, nitrides, carbides or oxynitrides, and composite thereof.

Preferably, the black inorganic pigment is selected from carbon black and graphite, and in particular carbon black. Examples of carbon black include channel black, furnace black, thermal black, acetylene black and lamp black.

In one preferred embodiment of the present invention, the inorganic black pigment is thermal carbon black.

The inorganic black pigment can be surface-treated or -coated with known surface treatment material, for example, organosilane compounds, aluminum compounds, titanium compounds, silicon oxide, titanium oxide, germanium oxide, cerium oxide, aluminum oxide, magnesium oxide, zirconium oxide or their mixtures.

The inorganic black pigment may have an average primary particle size of 5 nm or more, preferably 10 nm or more, more preferably 50 nm or more, and in particular 100 nm or more, and/or of 1 μm or less, preferably 700 nm or less, more preferably 500 nm or less, and in particular 300 nm or less.

The term "average primary particle size" used herein represents a number-average size mean diameter which is given by the statistical particle size distribution to half of the population, referred to as D50. For example, the number-average size mean diameter can be measured by a laser diffraction particle size distribution analyzer.

The inorganic black pigment may have a specific surface area determined by BET method of 0.5 $m^2/g$ or more, preferably 1 $m^2/g$ or more, more preferably 3 $m^2/g$ or more, and even more preferably 5 $m^2/g$ or more and/or 1000 $m^2/g$ or less, preferably 500 $m^2/g$ or less, more preferably 100 $m^2/g$ or less, and even more preferably 50 $m^2/g$ or less. In the present invention, the "specific surface area determined by BET method" can mean a value determined with reference to ASTM D6556, i.e. "Standard Test Method for Carbon Black—Total and External Surface Area by Nitrogen Adsorption" using nitrogen.

The inorganic black pigment of the present invention may have an oil absorption capacity of 5 mL/100 g or more, preferably 10 mL/100 g or more, more preferably 20 mL/100 g or more, and even more preferably 30 mL/100 g or more, and/or of 200 mL/100 g or less, preferably 150 mL/100 g or less, more preferably 100 mL/100 g or less, and even more preferably 50 mL/100 g or less. The oil absorption capacity herein can be measured with a pigment test method in accordance with ASTM D2414 using dibutyl phthalate as the oil.

Examples of commercially available products of carbon black include Thermax® N990, N991, N907, and N908 sold by Cancarb Limited, which are thermal carbon blacks.

As the organic black pigment, mention can be made of anthraquinone black pigments, benzofuranone black pigments, perylene black pigments, aniline black pigments, azo black pigments, lactam black pigments, and azomethine black pigments.

As the perylene black pigments, mention can be made of, pigment Black 31 or 32 (the numerical values are all CI numbers) and Lumogen® Black K 0086, K 0087 and K 0088 sold by BASF. Examples of the azomethine black pigments include those available as, for example, Chromofine® Black A1103 manufactured by Dainichiseika Color & Chemicals. As the aniline black pigments, mention can be made of Paliotol® Black L0080 sold by BASF. As the lactam black pigments, mention can be made of Irgaphor® Black S 0100 CF manufactured by BASF.

In one preferred embodiment of the present invention, the organic black pigment is perylene black pigment.

In one preferred embodiment of the present invention, the black pigment is selected from carbon black, in particular thermal carbon black, and perylene black pigments, and combinations thereof.

In another embodiment of the present invention, the composition according to the present invention comprise $TiO_2$ black pigment in an amount of 10% by weight or less, preferably 7% by weight or less, more preferably 5% by weight or less, even more preferably 3% by weight or less, and in particular 1% by weight or less, relative to the total weight of the composition.

The black pigment may be present in the composition according to the present invention in an amount of 0.005% by weight or more, preferably 0.01% by weight or more, more preferably by weight or more, and even more preferably 0.08% by weight or more; and/or may be 15% by weight or less, preferably 10% by weight or less, more preferably 8% by weight or less, and even more preferably 6% by weight or less, relative to the total weight of the composition.

The black pigment may be present in the composition according to the present invention in an amount of 0.005% to 15% by weight, preferably 0.01% to 10% by weight, more preferably to 8% by weight, and even more preferably 0.08% to 6% by weight, relative to the total weight of the composition.

(Other Ingredients)

Photopolymerization Inhibitor

The composition according to the present invention may comprise at least one photopolymerization inhibitor.

The photopolymerization inhibitor may comprise one type of photopolymerization inhibitor, or may comprise two or more types of photopolymerization inhibitors in combination.

The photopolymerization inhibitor of the present invention comprises at least one alkoxylated polyol derived (meth)acrylate or at least one quinone derivative compound.

The alkoxylated polyol derived (meth)acrylate may be mono-functional, bi-functional, tri-functional, or tetra-functional.

The polyol moiety of the alkoxylated polyol derived (meth)acrylate may be selected from di- to octa-hydric polyols. Examples of the di- to octa-hydric polyols include dihydric alcohols, such as ethylene glycol, propylene glycol, butylene glycol, hexamethylene glycol, and neopentyl glycol; trihydric alcohols, such as glycerol, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerol, pentaglycerol, 1,2,4-butanetriol, 1,2,4-pentanetriol, trimethylolethane, and trimethylolpropane; and tetrahydric alcohols, such as pentaerythritol, 1,2,3,4-pentanetetrol, 2,3,4,5-hexanetetrol, 1,2,4,5-pentanetetrol, and 1,3,4,5-hexanetetrol.

The alkoxylated portion of the alkoxylated polyol derived (meth)acrylate may be selected from a methoxylated portion, ethoxylated portion, butoxylated portion, and propoxylated portion. The repeated number of the alkoxylated portion in the alkoxylated polyol derived (meth)acrylate is not particularly limited, but is in general from 1 to 30, preferably 1 to 20, more preferably 1 to 10, and even more preferably from 1 to 5.

As the mono-functional alkoxylated polyol derived (meth)acrylate, mention can be made of methoxyethylene glycol acrylate, methoxypolypropylene glycol acrylate, methoxypolyethylene glycol acrylate, ethoxydiethylene glycol acrylate, and neopentyl glycol propoxylate methylether monoacrylate.

As the bi-functional alkoxylated polyol derived (meth) acrylate, mention can be made of alkoxylated neopentyl glycol diacrylate, such as ethoxylated neopentyl glycol diacrylate, and propoxylated neopentyl glycol diacrylate.

As the tri-functional alkoxylated polyol derived (meth) acrylate, mention can be made of ethoxylated trimethylolpropane triacrylate, propoxylated trimethylolpropane triacrylate, and propoxylated glycerol triacrylate. As a commercialized product of propoxylated glycerol triacrylate, mention can be made of Genorad 16 sold by Rahn.

As the tetra-functional alkoxylated polyol derived (meth) acrylate, mention can be made of ethoxylated pentaerythritol tetraacrylate.

The quinone derivative compound may be a quinone methide compound. As one specific embodiment of the quinone methide compound, mention can be made of 2,6-bis(1,1-dimethylethyl)-4-(phenylenemethylene)cyclohexa-2,5-dien-1-one, which is sold under the name of Irgastab® UV22 sold by BASF.

The photopolymerization inhibitor may be present in an amount of 0.005% by weight or more, preferably 0.01% by weight or more, more preferably 0.03% by weight or more, and even more preferably 0.05% by weight or more, and may be present in an amount of 5% by weight or less, preferably 3% by weight or less, more preferably 2% by weight or less, and even more preferably 1% by weight or less, relative to the total weight of the composition.

Antioxidant

The composition according to the present invention may comprise at least one antioxidant. The antioxidant may comprise one type of antioxidant, or may comprise two or more types of antioxidants in combination.

Such an antioxidant is not particularly limited, but may include a hindered phenol-type antioxidant, a phosphorus-type antioxidant, a lactone-type antioxidant, a hydroxylamine-type antioxidant, a vitamin E-type antioxidant, and a sulfur-based antioxidant.

As the hindered phenol-type antioxidant, mention can be made of triethylene glycol-bis [3-(3-tert-butyl-5-methyl-4-hydroxyphenyl)propionate], which is available from BASF under the name of IRGANOX 245, 1,6-hexanediol-bis[3-(3,5-di-tert-butyl-4-hydroxyphenyl)propionate, which is available from BASF under the name of IRGANOX 259, 4-bis-(n-octylthio)-6-(4-hydroxy-3,5-di-tert-butylanilino)-1,3,5-triazine, which is available from BASF under the name of IRGANOX 565, pentaerythrityl-tetrakis[3-(3,5-di-tert-butyl-4-hydroxyphenyl)propionate, which is available from BASF under the name of IRGANOX 1010, 2,2-thio-diethylenebis [3-(3,5-di-tert-butyl-4-hydroxyphenyl)propionate], which is available from BASF under the name of IRGANOX 1035, octadecyl-3-(3,5-di-tert-butyl-4-hydroxyphenyl)propionate, which is available from BASF under the name of IRGANOX 1076, N,N'-hexamethylenebis(3,5-di-tert-butyl-4-hydroxyhydrocinnamide), which is available from BASF under the name of IRGANOX 1098, 3,5-ditert-butyl-4-hydroxy-benzylphosphonate-diethyl ester, which is available from BASF under the name of IRGAMOD 295, 1,3,5-trimethyl-2,4,6-tris(3,5-di-tert-butyl-4-hydroxybenzyl)benzene, which is available from BASF under the name of IRGANOX 1330, tris-(3,5-di-tert-butyl-4-hydroxybenzyl)isocyanurate, which is available from BASF under the name of IRGANOX 3114, octylated diphenylamine, which is available from BASF under the name of IRGANOX 5057, 2,4-bis[(octylthio)methyl)-o-cresol, which is available from BASF under the name of IRGANOX 1520L, isooctyl-3-(3,5-di-tert-butyl-4-hydroxyphenylpropionate, which is available from BASF under the name of IRGANOX 1135, 2,4-bis(dodecylthiomethyl)-6-methylphenol, which is available from BASF under the name of IRGANOX 1726, 2,5,7,8-tetramethyl-2-(4,8,12-trimethyltridecyl)chroman-6-ol, which is available from BASF under the name of IRGANOX E201, and 5,7-di-tert-butyl-3-(3,4-dimethylphenyl) benzofuran-2(3H)-one which is available from BASF under the name of IRGANOX HP-136, and combinations thereof.

As the phosphorus-type antioxidant, mention can be made of triphenylphosphine, tri phenyl phosphite, tris(nonylphenyl)phosphite, tris(2,4-di-tert-butylphenyl)phosphite, which is available from BASF under the name of IRGAFOS 168, tris(2,4-dibutyl-5-methylphenyl)phosphite, tri(decyl)phosphite, tris[2-[[2,4,8,10-tetrakis(1,1-dimethylethyl)dibenzo [d,f] [1,3,2]dioxaphosphepin-6-yl]oxy] ethyl]amine, which is available from BASF under the name of IRGAFOS 12, bis(2,4-di-tert-butyl-6-methylphenyl) ethyl phosphite, which is available from BASF under the name of IRGAFOS 38, and biphenyl-4,4'-diyl-bis[bis(2,4-di-tert-butyl-5-methylphenoxy)phosphine], which is available from Osaki Industry under the name of GSY-P101, and combinations thereof.

As the lactone-type antioxidant, mention can be made of a reaction product of 3-hydroxy-5,7-di-tert-butyl-furan-2-one with o-xylene (CAS No, 181314-48-7).

As the hydroxylamine-type antioxidant, mention can be made of an oxidation product of alkylamine, of which the raw material is a reduced beef tallow, and the like.

As the vitamin E type antioxidant, mention can be made of 3,4-dihydro-2,5,7,8-tetramethyl-2-(4,8,12-trimethyltridecyl)-2H-benzopyran-6-ol.

As the sulfur-based antioxidant, mention can be made of didodecyl 3,3-thiobispropionate, which is available from BASF under the name of IRGANOX PS800, and dioctadecyl 3,3-thiobispropionate, which is available from BASF under the name of IRGANOX PS802.

In one preferred embodiment of the present invention, the antioxidant is selected from hindered phenol-type antioxidants. In another preferred embodiment of the present invention, the hindered phenol-type antioxidant can be represented by the following formula (IV):

(Formula IV)

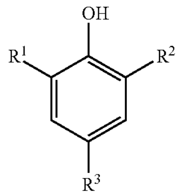

in which, $R^1$ and $R^3$ represent, independently of each other, a linear or branched, saturated or unsaturated alkyl group, preferably having 4 or more carbon atoms, more preferably having 5 to 16 carbon atoms, and even more preferably having 6 to 12 carbon atoms, which is optionally interrupted by at least one heteroatom, such as O, S, and N;

$R^2$ represents an alkyl group, preferably an alkyl group having 1 to 3 carbon atoms, and more preferably a methyl group.

In formula (IV), $R^1$ and $R^3$ preferably represent a linear and saturated alkyl group. Preferably, $R^1$ and $R^3$ in formula (I) represent an alkyl group interrupted by at least one carbonyl group (—OC—), carbonyloxy group (—OC—O—), and/or a sulfur atom (—S—).

As other examples of the antioxidants, the following commonly used antioxidants can also be included: phenols such as 4-methoxy phenol, 4-tert-butylcatechol; hydroquinones such as 1,4-dihyrdroxybenzene or 3,5-di-tert-butylbenzene-1,2-diol; quinones such as 1,4-benzoquinone or naphthalene-1,2-dione; aromatic nitro compounds such as 1,3-dinitrobenzene or 1,4-dinitrobenzene; nitrophenols such as 2-(sec-butyl)-4,6-dinitrophenol, 4-methyl-2-nitrophenol, or 4-methyl-2,6-dinitrophenol; amines such as phenothiazine, $N^1$-phenyl-$N^4$-propylbenzene-1,4-diamine, N-(1,4-dimethylpentyl)-N' phenyl-p-phenylenediamine, N,N-diethylhydroxylamine, or 2,2,6,6-tetramethylpiperidine; nitroso compounds such as N-nitrosophenylhydroxylamine ammonium salt; nitroxide compounds such as bis(1-oxyl-2,2,6,6-tetramethylpiperidin-4-yl) sebacate, 1-oxyl-2,2,6,6-tetramethylpiperidine, 1-oxyl-2,2,6,6-tetramethyl piperidin-4-ol, 1-oxyl-2,2,6,6-tetramethyl-4-n-butoxypiperidine; and mixtures thereof.

The antioxidant may be present in an amount of 0.01% by weight or more, preferably by weight or more, more preferably 0.1% by weight or more, and even more preferably 0.2% by weight or more, and in particular 0.5% by weight or more, and may be present in an amount of 8% by weight or less, preferably 5% by weight or less, more preferably 3% by weight or less, and even more preferably 2% by weight or less, relative to the total weight of the composition.

The photocurable black silicone composition according to the present invention may also comprise any optional additive(s) usually used in the field, chosen, for example, from organopolysiloxanes other than component (A) above, organic or inorganic dyes or fillers, adhesion-imparting agents, resistance imparting agents, releasing agents, heat resistance agents, dispersing agents, flame retardancy imparting agents, and mixtures thereof.

As the fillers which can be used in the present invention, mention can be made of silica, fumed silica, glass beads, and glass fibers.

The photocurable silicone composition of the present invention can be cured by an active energy ray irradiation (e.g. ultraviolet radiation or the like). Therefore, in one embodiment, the photocurable black silicone composition of the present invention is a UV curable black silicone composition. The wavelength of the ultraviolet radiation to be applied is not particularly limited to, but preferably in the range of 360 nm to 395 nm. The irradiation can be carried out at 500 to 1500 J/cm$^2$. For example, the photocurable black silicone composition can be cured by irradiation of UV rays (wavelength: 395 nm, 1000 J/cm 2) from a metal halide lamp. The irradiation is not particularly limited to, but in general in the range of 1 second to 60 seconds, preferably 5 seconds to 30 seconds, and more preferably 10 seconds to 20 seconds.

The photocurable black silicone composition according to the present invention can be prepared by mixing the above-described essential and optional components in a conventional manner. The mixing method of each components can be conducted with a conventionally known method and is not particularly limited. For example, the mixing is carried out by simple stirring or mixing using a mixing device, such as a uniaxial or biaxial continuous mixer, a double roll, a Hobart mixer, a dental mixer, a planetary mixer, a kneader mixer, and a Henschel mixer.

[Sealing Agent and Sheet Film]

The present invention also relates to a sealing agent or a sheet film using the photocurable silicone composition according to the present invention. The sealing agent of the present invention is preferably used for sealing a semiconductor substrate for an optical semiconductor. The sheet film of the present invention is preferably used as a sealing material layer or an adhesive or a protective sheet film for a mass transfer process.

The sealing agent or sheet film according to the present invention is obtained by, for example, applying the curable silicone composition of the present invention on a film, tape, or sheet substrate, and then irradiating the curable silicone composition with UV rays to cure, in order to obtain a cured film on the surface of the substrate. The film thickness of the cured film is not particularly limited, but is preferably in the range of 1 um to 10 mm, or in the range of 5 um to 5 mm.

In the present specification, the term "UV" means electromagnetic radiation having a wavelength of about 10 nm to about 400 nm, and in ultraviolet curing, a wavelength of 280 nm to 400 nm, in particular 360 nm to 395 nm, can be employed. Examples of a device that generates UV rays include a metal halide lamp, a high-pressure mercury lamp, a medium-pressure mercury lamp, and an ultraviolet LED. The irradiance level of UV rays is not particularly limited, but is preferably 1 to 1,000 mW/cm$^2$, more preferably 5 to 500 mW/cm$^2$, and even more preferably 10 to 200 mW/cm 2 at 365 nm.

EXAMPLES

The present invention will be described in more detail by way of examples which however should not be construed as limiting the scope of the present invention.

The photocurable black silicone compositions of the present invention will be described in detail by examples and comparative examples. In the examples and comparative examples, the following components were used to prepare the photocurable black silicone compositions. The numerical values for the amounts of the components shown in the tables are all based on "parts by weight" as active raw materials.

Components:

(a-1): vinyl-group containing linear organopolysiloxane (the content of vinyl groups is mol %, $MViD_{310}MVi$)

(a-2): vinyl- and phenyl-group containing linear organopolysiloxane (divinyl-polyphenylmethylsiloxane, the content of vinyl groups is 3.8 mol %, the content of phenyl groups is 44 mol %, $M(Vi)D(Ph)_{20}M(Vi)$)

(a-3): cyclic organopolysiloxane ($DVi_4$, the content of vinyl groups is 50 mol %)

(b-1): [(mercaptopropyl)methylsiloxane]-dimethylsiloxane copolymer (product name: SMS-142, obtained from Gelest)

(b-2): trimethylolpropane tris(3-mercaptopropionate)

(b-3): (mercaptopropyl)methylsiloxane homopolymer (product name: SMS-992, obtained from Gelest)

(b-4): trimethylolpropane tris(3-mercaptobutylate) (product name: KalenzMT TPMB sold by Showa Denko)

(c-1): (2,4,6-trimethylbenzoyl)-diphenyl-phosphine oxide, which is sold by IGM RESINS B.V under the name of Omnirad TPO-H (c-2): bis(2,4,6-trimethylbenzoyl)phenylphosphine oxide, which is sold by IGM RESINS B.V under the name of Omnirad 819

(c-3): a combination of ethyl phenyl-(2,4,6-trimethylbenzoyl)-phosphinate (about 95 wt %) and bis(2,4,6-trimethylbenzoyl)phenylphosphine oxide (about 5 wt %), which is sold by IGM RESINS B.V under the name of Omnirad 2100

(c-4): 1-[4-(phenylthio) phenyl]-1,2-octanedione-2-(o-benzoyloxime), which is sold by BASF under the name of Irgacure OXE-01

(c-5): 2-hydroxy-2-methyl-1-phenyl-1-propanone (product name: Omnirad 1173)

(c'-1): 2-methyl-1-[4-(methylthio)phenyl]-2-(4-morpholinyl)-propane-1-one (product name: Omnirad 907)

(c'-2): 1-hydroxycyclohexyl-phenylketone (product name: Omnirad 184)

(d-1) thermal carbon black, which is sold by Cancarb Limited under the name of Thermax® N990, which has an average primary particle size of 230 nm, a specific surface area determined by BET method of 7.0 to 12 $m^2/g$, and an oil absorption capacity of 44 ml/100 g.

(d-2) perylene black pigment, which is sold by BASF under the name of Lumogen® Black K 0088

(d-3) Furnace carbon black, which is sold by Orion Engineered Carbons under the name of COLOUR BLACK FW200, which has an average primary particle size of 13 nm, a specific surface area determined by BET method of 550 $m^2/g$, and an oil absorption capacity of 160 ml/100 g.

Evaluation (Curability)

Examples 1 to 8 and Comparative Examples 1 and 2

The obtained curable compositions of Examples 1 to 8 and Comparative Examples 1 and 2 were applied on a substrate so that the thickness of the applied composition was 2 mm. Ultraviolet light was irradiated to the applied sample from the opposite side of the substrate using a metal halide lamp (395 nm, 1000 J/cm 2). After the irradiation, the cured film was taken from the surface of the sample and the thickness of the cured film was measured with a film-thickness measuring device. The thickness of the cured film indicates a depth to which the composition could be cured. An excellent curability was achieved when the thickness of the cured film was greater than 1000 μm.

Examples 9 to 17

The obtained curable compositions of Examples 9 to 17 were applied on a substrate so that a thickness of the applied composition was 400 μm. Ultraviolet light was irradiated to the applied sample from the opposite side of the substrate using a metal halide lamp (365 nm, 200 $mJ/cm^2$). After the irradiation, the cured state was observed.

The results are summarized in Tables 1 and 2 below.

TABLE 1

| Components | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|
| a-1 | 90.6 | 90.6 | 90.6 | 90.6 | 90.5 | 90.6 | — | — | 90.6 | 90.6 |
| a-2 | — | — | — | — | — | — | 92.9 | 92.9 | — | — |
| b-1 | 8.3 | 8.3 | 8.3 | 8.3 | 8.3 | 8.3 | — | — | 8.3 | 8.3 |
| b-2 | — | — | — | — | — | — | 6 | 6 | — | — |
| c-1 | 1 | — | — | — | — | — | — | — | — | — |
| c-2 | — | 1 | — | — | — | — | — | — | — | — |
| c-3 | — | — | 1 | — | — | — | 1 | — | — | — |
| c-4 | — | — | — | 1 | 1 | 1 | — | 1 | — | — |
| c'-1 | — | — | — | — | — | — | — | — | 1 | — |
| c'-2 | — | — | — | — | — | — | — | — | — | 1 |
| d-1 | 0.1 | 0.1 | 0.1 | 0.1 | 0.2 | — | 0.1 | 0.1 | 0.1 | 0.1 |
| d-2 | — | — | — | — | — | 0.1 | — | — | — | — |
| Total | 100 | 100 | 100 | 100 | 100 | 100 | 100 | 100 | 100 | 100 |
| SH/Vi ratio (mole) | 1.2 | 1.2 | 1.2 | 1.2 | 1.2 | 1.2 | 1.2 | 1.2 | 1.2 | 1.2 |
| Evaluation | | | | | | | | | | |
| Cured Thickness (μm) | 1080 | 1080 | 1830 | 1740 | 1370 | 1530 | 1030 | 1030 | 400 | 415 |

TABLE 2

| Components | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| a-1 | 90.25 | 86.17 | 90.25 | 86.17 | 90.25 | 86.17 | 86.17 | — | — |
| a-2 | — | — | — | — | — | — | — | — | 85.93 |
| a-3 | — | — | — | — | — | — | — | 35.3 | — |
| b-1 | 8.25 | 7.88 | 8.25 | 7.88 | 8.25 | 7.88 | 7.88 | — | — |
| b-3 | — | — | — | — | — | — | — | 58.7 | — |
| b-4 | — | — | — | — | — | — | — | — | 8.07 |
| c-4 | — | — | — | — | — | — | 0.95 | — | — |
| c-5 | 1 | 0.95 | 1 | 0.95 | 1 | 0.95 | — | 1 | 1 |
| d-1 | 0.5 | 5 | — | — | — | — | 5 | 5 | 5 |
| d-2 | — | — | — | — | 0.5 | 5 | — | — | — |
| d-3 | — | — | 0.5 | 5 | — | — | — | — | — |
| Total | 100 | 100 | 100 | 100 | 100 | 100 | 100 | 100 | 100 |
| SH/Vi ratio (mole) | 1.2 | 1.2 | 1.2 | 1.2 | 1.2 | 1.2 | 1.2 | 1.2 | 1.2 |
| Evaluation | | | | | | | | | |
| Cured State | Completely cured | Completely cured | Completely cured | Completely cured | Completely cured | Completely cured | Completely cured | Completely cured | Completely cured |

As can be seen from the results in Tables 1 and 2, the embodiments of the photocurable silicone compositions according to the present invention exhibited an excellent curability by UV radiation under air conditions, even though they include black pigments in a sufficient amount.

Therefore, it can be concluded that the photocurable silicone composition according to the present invention is very useful for applications in the manufacturing of semiconductor substrates, in particular LED substrates for displays.

What is claimed is:

1. A photocurable silicone composition comprising:

(A) at least one organopolysiloxane having at least two alkenyl groups per molecule;

(B) at least one mercapto functional compound having at least two thiol groups per molecule;

(C) at least one photopolymerization initiator selected from acylphosphine oxide-type photopolymerization initiators, oxime ester-type photopolymerization initiators, and alpha-hydroxyacetophenone-type photopolymerization initiators other than 1-hydroxycyclohexylphenylketone; and (D) at least one black pigment.

2. The composition according to claim 1, wherein the (D) black pigment is selected from carbon black.

3. The composition according to claim 2, wherein the carbon black has an average primary particle size of 5 nm or more and 1 μm or less.

4. The composition according to claim 2, wherein the carbon black has a specific surface area determined by BET method of 0.5 $m^2/g$ or more and 1000 $m^2/g$ or less.

5. The composition according to claim 2, wherein the carbon black has an oil absorption capacity of 5 mL/100 g or more and 200 mL/100 g or less.

6. The composition according to claim 1, wherein the (D) black pigment is selected from organic black pigments.

7. The composition according to claim 6, wherein the organic black pigment are selected from perylene black pigments.

8. The composition according to claim 1, wherein the (A) organopolysiloxane having at least two alkenyl groups per molecule is present in an amount of 10% by weight or more and 98% by weight or less relative to the total weight of the composition.

9. The composition according to claim 1, wherein the (B) mercapto functional compound has thiol groups is present in an amount of 1% by weight or more and 90% by weight or less relative to the total weight of the composition.

10. The composition according to claim 1, wherein the molar ratio of the thiol groups to alkenyl groups included in the composition is 0.1 or more and 5.0 or less.

11. A sealing agent or sheet film formed with the photocurable silicone composition according to claim 1.

* * * * *